(12) United States Patent
Kim et al.

(10) Patent No.: US 8,250,712 B2
(45) Date of Patent: Aug. 28, 2012

(54) HINGE DEVICE HAVING A PLURALITY OF AXES FOR A PORTABLE TERMINAL AND A CONNECTION MEMBER HAVING THE PLURALITY OF AXES

(75) Inventors: Jin-Soo Kim, Suwon-si (KR); Young-Ki Kim, Yongin-si (KR); Shin-Chul Kamg, Seoul (KR)

(73) Assignee: Samsung Electronics Co., Ltd (KR)

( * ) Notice: Subject to any disclaimer, the term of this patent is extended or adjusted under 35 U.S.C. 154(b) by 149 days.

(21) Appl. No.: 11/851,960

(22) Filed: Sep. 7, 2007

(65) Prior Publication Data

US 2008/0064452 A1    Mar. 13, 2008

(30) Foreign Application Priority Data

Sep. 7, 2006    (KR) .................. 10-2006-0086210

(51) Int. Cl.
*E05D 3/10*    (2006.01)
(52) U.S. Cl. ............. 16/367; 16/361; 16/362; 16/366; 403/61; 403/111; 403/353
(58) Field of Classification Search ............ 16/358, 16/361, 362, 366, 367, 376, 377, 379; 403/61, 403/111, 353; 455/566, 575.1, 575.3, 575.4
See application file for complete search history.

(56) References Cited

U.S. PATENT DOCUMENTS

| | | | | |
|---|---|---|---|---|
| 2,650,871 A | * | 9/1953 | Holderegger | 312/322 |
| 4,485,524 A | * | 12/1984 | Neville | 16/241 |
| 5,334,354 A | * | 8/1994 | Johnston et al. | 422/104 |
| 6,195,839 B1 | * | 3/2001 | Patterson et al. | 16/334 |
| 7,003,104 B2 | * | 2/2006 | Lee | 379/433.13 |
| 7,010,834 B2 | * | 3/2006 | Barnett | 16/367 |
| 7,055,219 B2 | * | 6/2006 | Shiba | 16/367 |
| 7,117,564 B2 | * | 10/2006 | Jeong | 16/334 |

(Continued)

FOREIGN PATENT DOCUMENTS

CN    1551600    12/2004

(Continued)

OTHER PUBLICATIONS http://www.alibaba.com/product-gs/343845633/van_cargo_truck_with_tail_lift.html.*

*Primary Examiner* — Victor Batson
*Assistant Examiner* — Roberta Delisle
(74) *Attorney, Agent, or Firm* — The Farrell Law Firm, P.C.

(57) ABSTRACT

A hinge having a plurality of movable axes enabling eccentric movement of an object connected to the hinge, and a connection member with a first hinge axis for enabling a first object to rotate about the first hinge axis, the connection member including a plurality of movable axes enabling eccentric movement of the object. The plurality of movable axes includes a central axis, a second hinge axis and a third hinge axis, and when the hinge or connection member moves with respect to the second hinge axis and the third hinge axis, the central axis moves. The hinge or connection member can be used in a portable terminal having a main body housing, where the folder rotates with respect to the first hinge axis towards or away from the main body housing, and the folder can rotate with respect to the first hinge axis.

16 Claims, 14 Drawing Sheets

U.S. PATENT DOCUMENTS

| | | | |
|---|---|---|---|
| 7,231,188 B2 * | 6/2007 | Godston et al. | 455/73 |
| 7,283,852 B2 * | 10/2007 | Fagerstrom et al. | 455/575.1 |
| 7,287,302 B2 * | 10/2007 | Park et al. | 16/330 |
| 7,346,375 B2 * | 3/2008 | Sato et al. | 455/575.3 |
| 7,433,723 B2 * | 10/2008 | Bae | 455/575.4 |
| 7,493,150 B2 * | 2/2009 | Watanabe et al. | 455/575.3 |
| 7,499,737 B2 * | 3/2009 | Mizuta et al. | 455/575.3 |
| 2003/0013417 A1 * | 1/2003 | Bum | 455/90 |
| 2004/0203527 A1 * | 10/2004 | Matsumoto | 455/90.3 |
| 2004/0224732 A1 * | 11/2004 | Lee et al. | 455/575.3 |
| 2005/0009556 A1 * | 1/2005 | Hickey et al. | 455/550.1 |
| 2005/0054393 A1 * | 3/2005 | Fagerstrom et al. | 455/575.1 |
| 2005/0095995 A1 * | 5/2005 | Bae | 455/90.3 |
| 2005/0107137 A1 * | 5/2005 | Byun et al. | 455/575.1 |
| 2006/0025184 A1 * | 2/2006 | Cho et al. | 455/575.4 |
| 2006/0030381 A1 * | 2/2006 | Byun et al. | 455/575.4 |
| 2006/0172764 A1 | 8/2006 | Makino | |
| 2006/0223596 A1 * | 10/2006 | Hur | 455/575.4 |

FOREIGN PATENT DOCUMENTS

| | | |
|---|---|---|
| CN | 1816065 | 8/2006 |
| EP | 1 475 943 | 5/2004 |
| EP | 1 530 346 | 11/2004 |
| EP | 1 686 768 | 11/2004 |
| EP | 1 699 209 | 9/2006 |
| JP | 08-185243 | 7/1996 |
| KR | 1020060078644 | 7/2006 |
| KR | 1020060088044 | 8/2006 |

\* cited by examiner

HINGE DEVICE HAVING A PLURALITY OF AXES FOR A PORTABLE TERMINAL AND A CONNECTION MEMBER HAVING THE PLURALITY OF AXES

PRIORITY

This application claims priority under 35 U.S.C. §119 to an application filed in the Korean Intellectual Property Office on Sep. 7, 2006 and assigned Serial No. 2006-86210, the contents of which are incorporated herein by reference.

BACKGROUND OF THE INVENTION

1. Field of the Invention

The present invention generally relates to a hinge device and, more particularly, to a hinge device having a plurality of axes to allow a central axis of a folder to move with respect to a plurality of hinge axes during rotation of the folder in a portable terminal and a connection member having the plurality of axes.

2. Description of the Related Art

A portable terminal generally refers to an apparatus which a user can carry with him/her to perform wireless communication with a desired partner. Conventional portable terminals may be classified into various types according to their appearance, such as bar-type terminals, flip-type terminals, folder-type terminals, etc. A bar-type terminal has a single housing shaped like a bar. A flip-type terminal has a flip which is rotatably combined with a bar-shaped housing by a hinge device. A folder-type terminal has a folder coupled to a single bar-shaped housing by a hinge device in a manner that the folder can rotate in a direction towards or away from the housing.

In addition, portable terminals may be classified into rotation-type terminals and sliding-type terminals according to ways of opening and closing the terminals. In a rotation-type terminal, two housings are coupled to each other in a manner that one housing rotates to be opened or closed with respect to the other while the housings face each other. In a sliding-type terminal, two housings are coupled to each other in a manner that one housing slides to be opened or closed with respect to the other. These variously classified portable terminals can be easily understood by those skilled in the art.

Portable terminals are typically light and compact for portability and are convenient only in voice or video communication with a partner.

Although multimedia availability of portable terminals has been emphasized with diversification of mobile communication services, the shapes of portable terminals are limited to folder types and sliding types. In addition, users' tastes have become diversified with widespread use of portable terminals, but conventional shapes of portable terminals cannot satisfy users' various tastes.

To solve this problem, display rotation-type portable terminals have been developed.

In a display rotation-type portable terminal, a display device of a folder rotates to allow the user to view moving pictures and videos on a wide screen.

As shown in FIG. 1, a conventional display rotation-type portable terminal includes a main body housing 10 having first hinge axis A1, a folder 20, and a connection member 30. Various key buttons 11 and a microphone 12 are mounted in the main body housing 10. The connection member 30 connects the main body housing 10 with the folder 20 so the folder 20 can rotate with respect to the hinge axis A1 in a direction towards or away from the main body housing 10.

The connection member 30 provides a second hinge axis that is perpendicular to the first hinge axis A1 and connects the folder 20 with the main body housing 10 so the folder 20 can rotate while facing the connection member 30. The folder 20 includes a Liquid Crystal Display (LCD) 21 as a display device and a speaker 22.

However, in a conventional display rotation-type portable terminal, when the folder is opened with respect to the first hinge axis to rotate the display device of the folder, a rotation space D1 is required between the main body housing and the folder to allow the end of a corner of the rectangular display device to rotate. Moreover, the display rotation axis of the folder is positioned in the center of the folder, generating the unnecessary rotation space. Furthermore, as size of the rotation space D1 increases with an increase in the size of the display device, the size of the portable terminal also increases, hindering miniaturization of the portable terminal.

As the size of the display device increases, the rotation axis is positioned in an upper portion of a main body. If the portable terminal is then placed on the ground, the folder can easily fall.

SUMMARY OF THE INVENTION

The present invention substantially solves at least the above problems and/or disadvantages and provides at least the advantages below. Accordingly, an aspect of the present invention is to provide a hinge device and/or a connection member for a portable terminal.

Another aspect of the present invention is to provide a hinge device having a plurality of axes for a portable terminal and a connection member having the plurality of axes, in which a central axis of a folder can move with respect to a plurality of hinge axes during rotation of the folder in a folder-type portable terminal in order to position the folder closely to a main body housing and thus minimize unnecessary rotation space generated during rotation, thereby contributing to miniaturization of the portable terminal.

Still another aspect of the present invention is to provide a hinge device having a plurality of axes for a portable terminal and a connection member having the plurality of axes, in which the connection member has the plurality of hinge axes that rotate a display device and a keypad of a folder-type portable terminal in order to rotate the display device and the keypad selectively according to use of the portable terminal, thereby facilitating use of the portable terminal.

According to an aspect of the present invention, there is provided a hinge having a plurality of movable axes enabling eccentric movement of an object connected to the hinge. The plurality of movable axes includes a central axis, a second hinge axis and a third hinge axis, and when the hinge moves with respect to the second hinge axis and the third hinge axis, the central axis moves.

According to another aspect of the present invention, there is provided a connection member with a first hinge axis for enabling a first object to rotate about the first hinge axis, the connection member including a plurality of movable axes enabling eccentric movement of the object. The plurality of movable axes includes a central axis, a second binge axis and a third hinge axis, and when the connection member moves with respect to the second hinge axis and the third hinge axis, the central axis moves.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described with reference to the accompanying drawings. In the following description, well-known functions or constructions are not described in detail since they would obscure the invention in unnecessary detail.

As shown in FIGS. 2-10, a portable terminal includes a main body housing 10, a folder 20 that rotates with respect to a first hinge axis A1 in a direction towards or away from the main body housing 10, and a connection member 30 that provides the first hinge axis A1 and connects the folder 20 with the main body housing 10 so the folder 20 can rotate with respect to the first hinge axis A1. The folder 20 has a central axis C1 that extends in a vertical direction.

The portable terminal includes a hinge device 100 having a plurality of movable axes in the connection member 30, as shown in FIGS. 5 through 10. As the folder 20 rotates about the first hinge axis A1 by an angle, the hinge device 100 moves with respect to a second hinge axis A2 and a third hinge axis A3 among the plurality of movable axes, thereby moving the central axis C1 of the folder 20. For example, when the folder 20 rotates an angle, such as 90°, the hinge device 100 moves with respect to the third hinge axis A3 and the second hinge axis A2 moves along a trace, thereby moving the central axis C1 of the folder 20.

Figure 1:
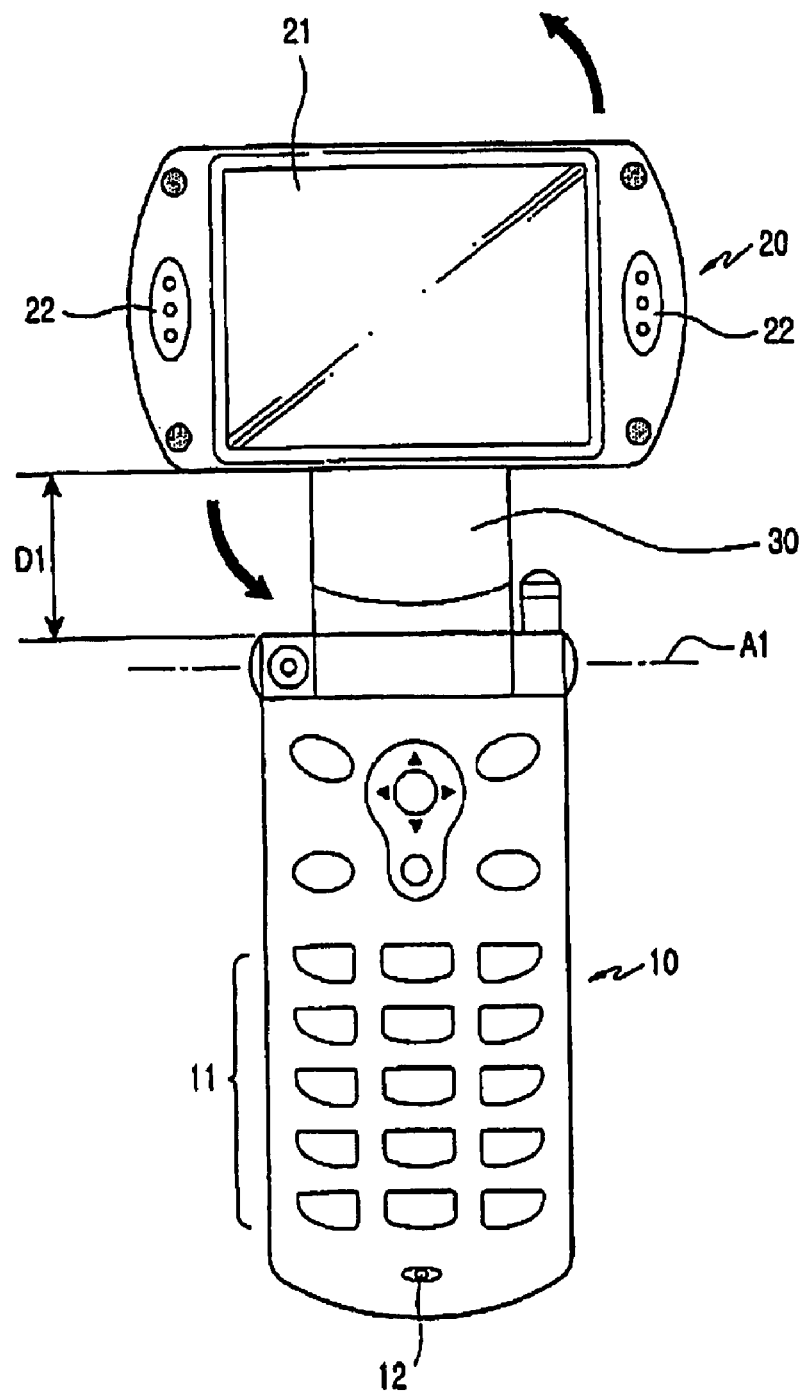
FIG. 1 is a front view showing a state in which a conventional display rotation-type portable terminal is used.
Figure 2:
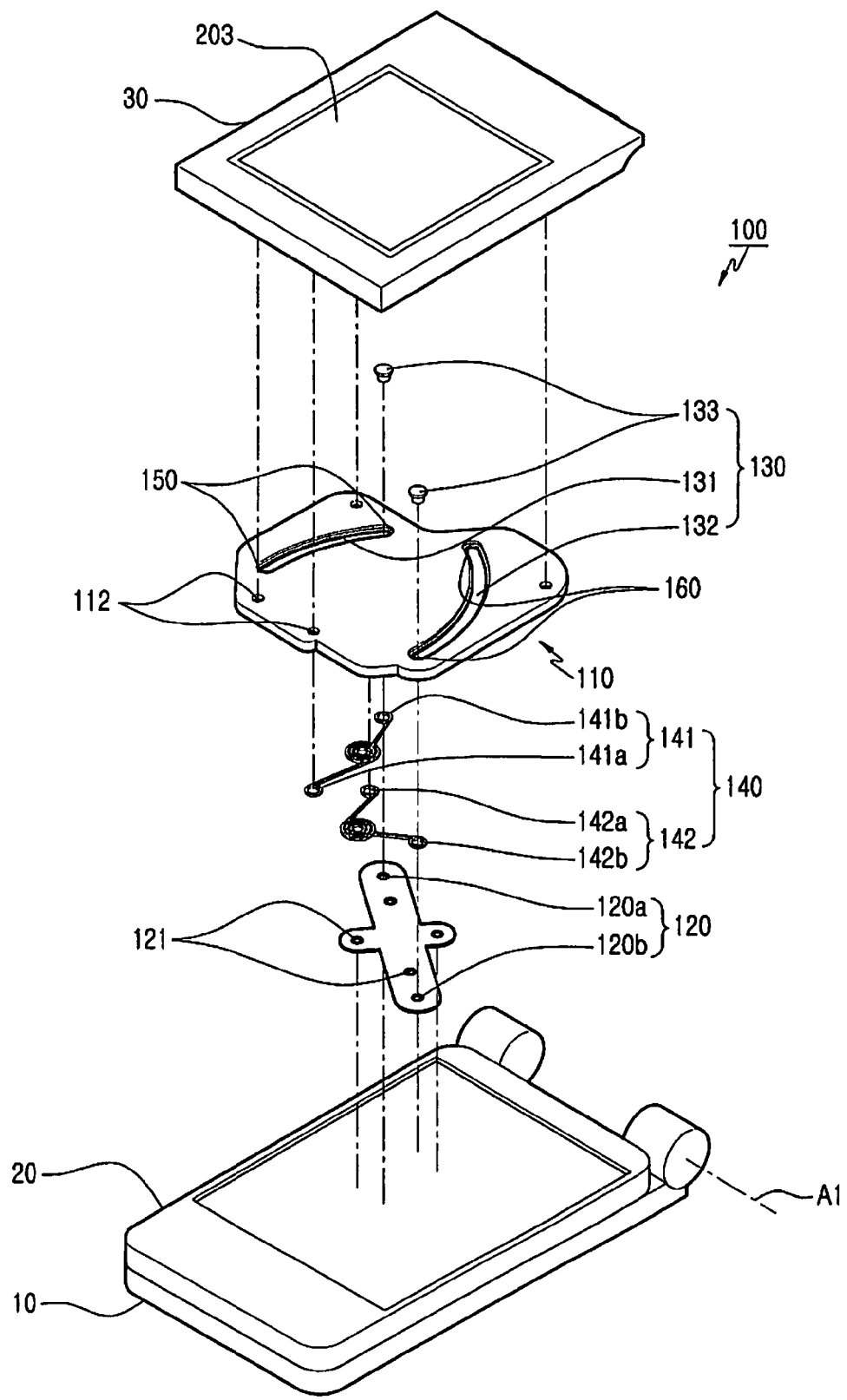
FIG. 2 is an exploded perspective view of a hinge device having a plurality of axes for a portable terminal according to the present invention.
Figure 3:
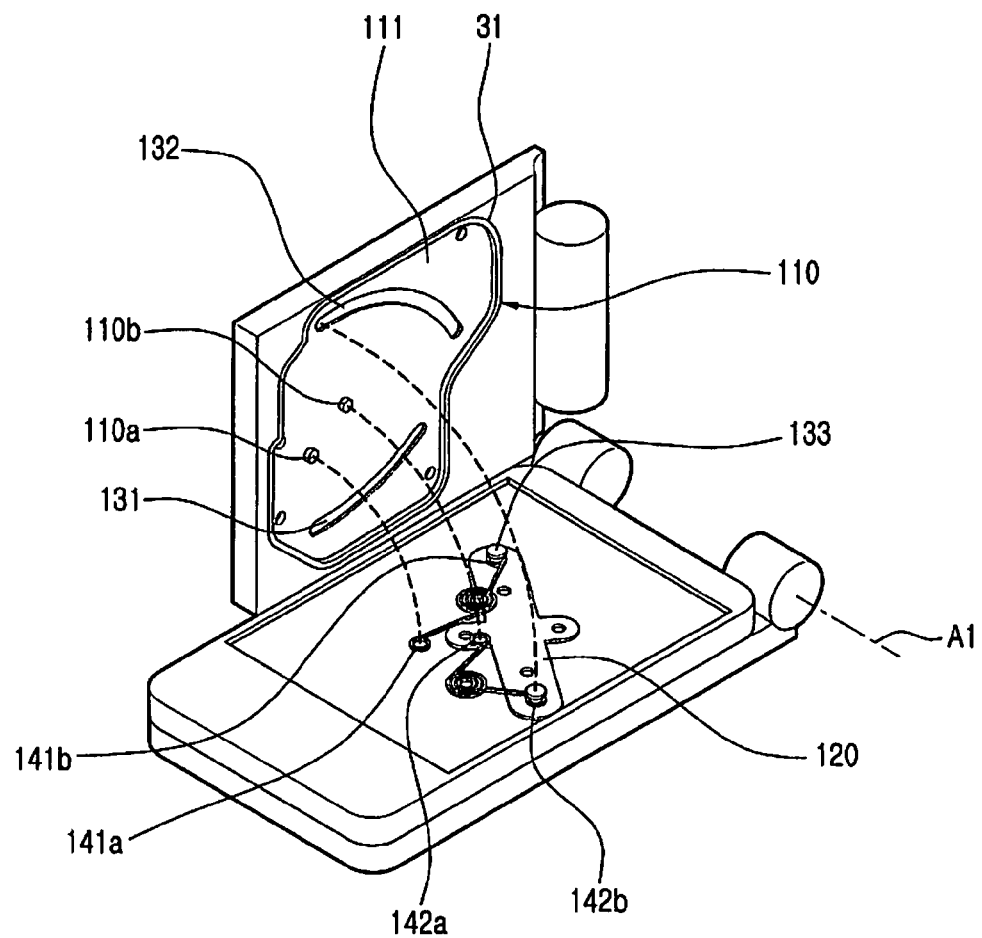
FIG. 3 is a perspective view showing a state in which a hinge device having a plurality of axes for a portable terminal according to the present invention is assembled.
Figure 4:
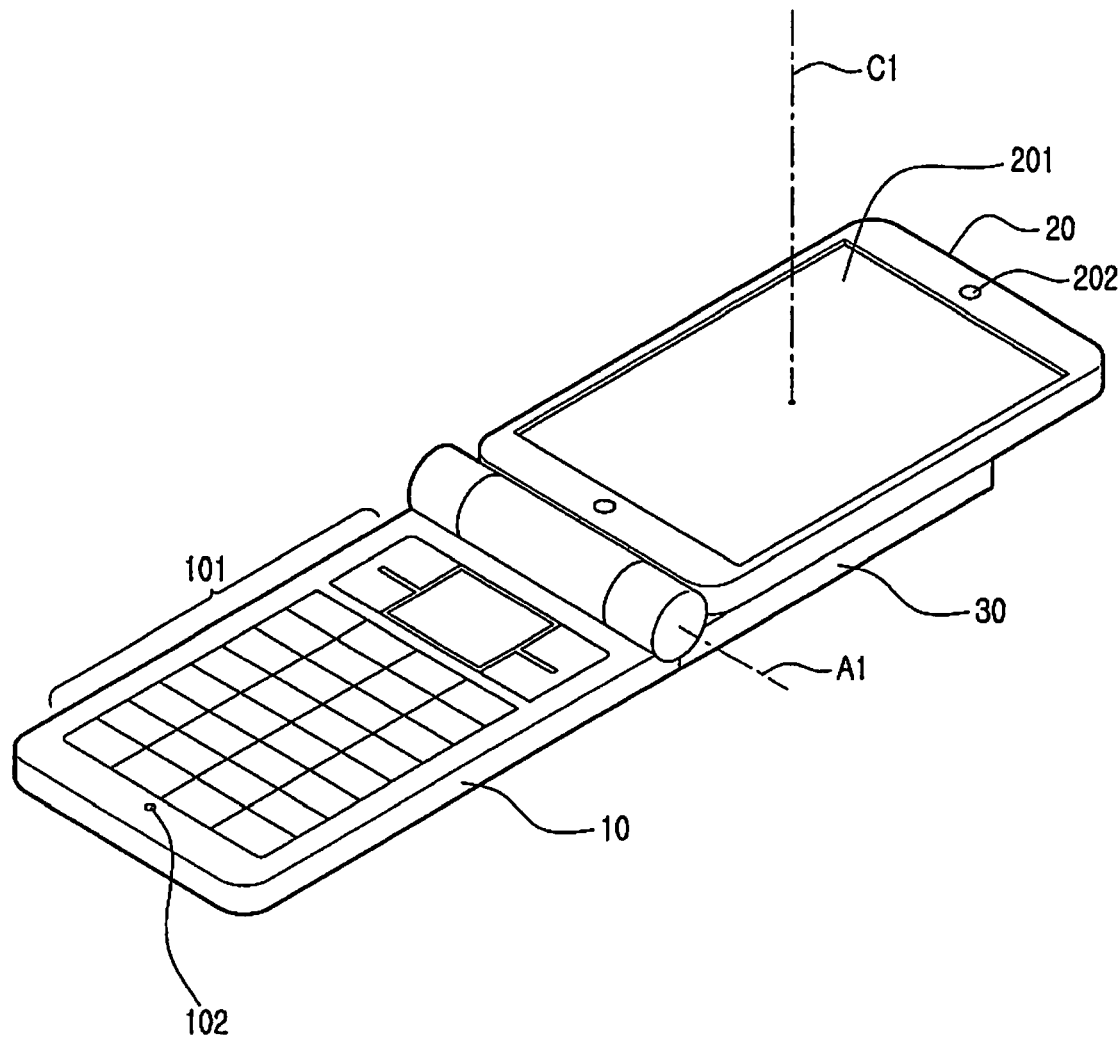
FIG. 4 is a perspective view showing a state in which a folder is opened in the structure of a hinge device having a plurality of axes for a portable terminal according to the present invention.

The hinge device 100 includes a base member 110, a link member 120, a guide 130, and a force supply 140, as shown in FIGS. 2 and 3. The base member 110 receives the link member 120, the guide 130, and the force supply 140, and is operatably engaged with the connection member 30. The link member 120 has ends 120a and 120b, and is engaged with the folder 20 to rotate by the guide 130 and the force supply 140. The guide 130 connects the link member 120 to the base member 110 so the link member 120 can rotate in the base member 110. The guide 130 is included in the base member 110 to guide the link member 120 so the link member 120 rotates during rotation of the folder 20. The force supply 140 is included between the base member 110 and the link member 120 to supply a force for allowing the link member 120 to rotate.

The link member 120 includes a mounting groove 31 for mounting of the base member 110 and the base member 110 includes a receiving space 111 for receiving the link member 120, the guide 130, and the force supply 140. At least one engagement fixing unit 112 is formed in the receiving space 111 to be engaged with the folder 20.

Both ends 120a and 120b of the link member 120 are rotatably combined with the guide 130, and the link member 120 includes at least one engagement fixing unit 121 to be engaged with and fixed to the folder 20.

Figure 5:
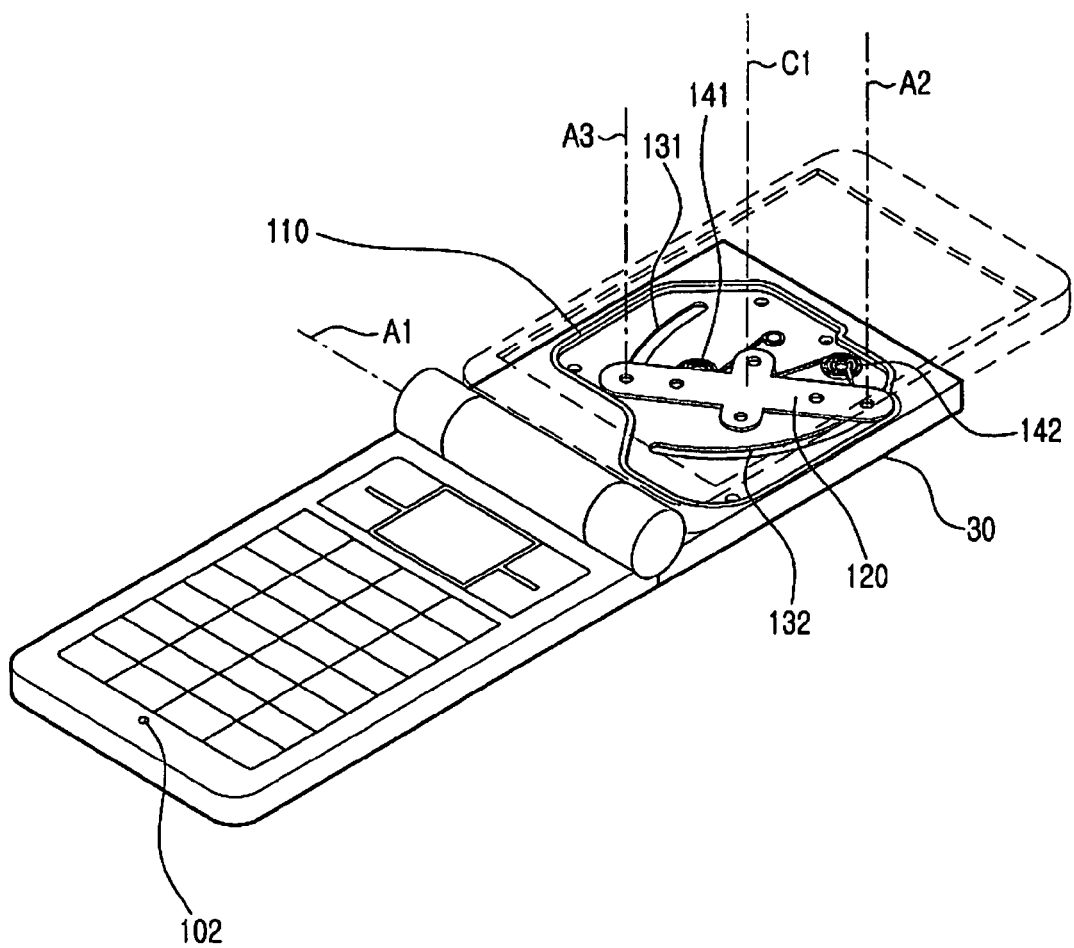
FIG. 5 is a perspective view showing a state in which a folder rotates in the structure of a hinge device having a plurality of axes for a portable terminal according to the present invention.
Figure 6:
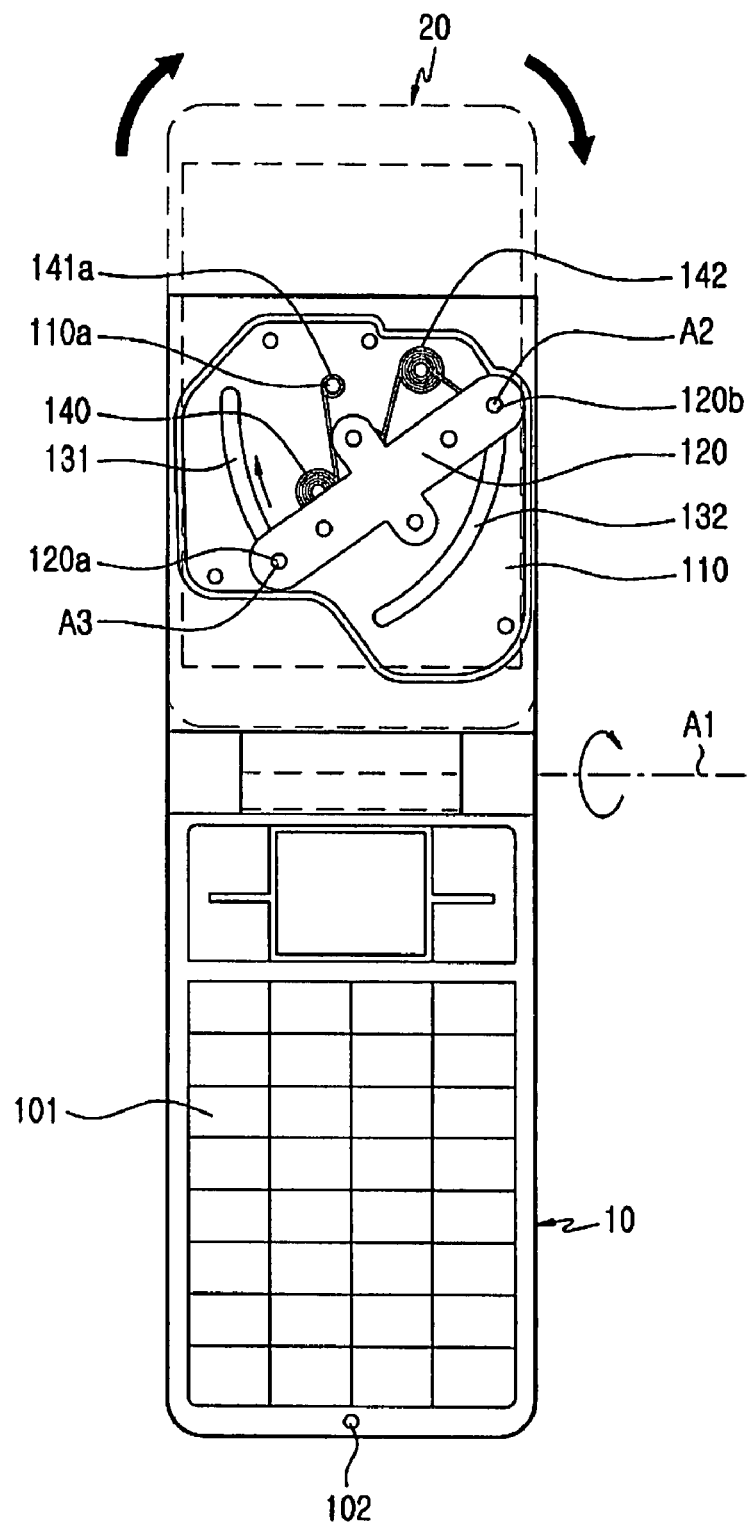
FIG. 6 is a front view showing a state in which a folder rotates in the structure of a hinge device having a plurality of axes for a portable terminal according to the present invention.
Figure 7:
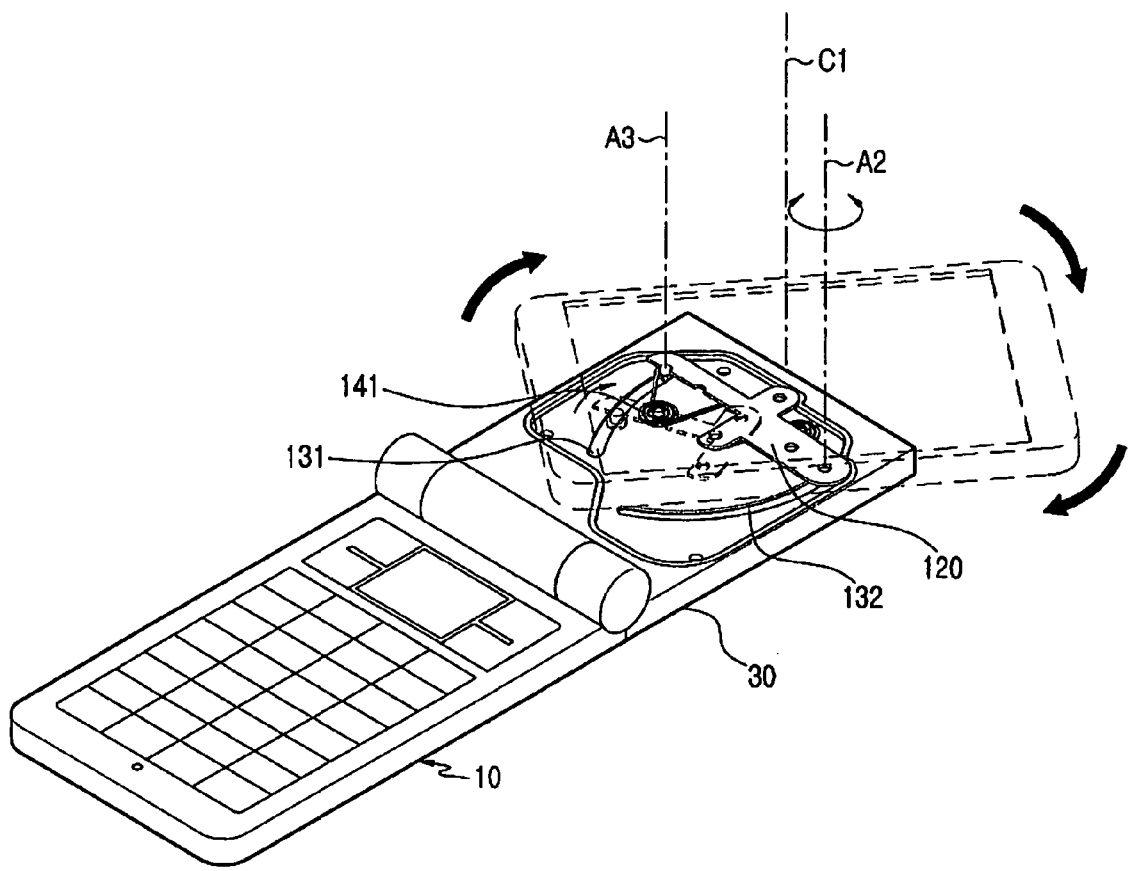
FIG. 7 is a perspective view showing a process in which a folder rotates in the structure of a hinge device having a plurality of axes for a portable terminal according to the present invention.

The guide 130 includes a first guide hole 131, a second guide hole 132, and at least two guide pins 133, as shown in FIGS. 2, 5 and 6. The first guide hole 131 is movably combined with one end 120a of the link member 120. The first guide hole 131 is defined through the base member 110 eccentrically from the central axis C1 of the folder 20 to guide the link member 120 so the end 120a of the link member 120 can move along a first trace when the folder 20 rotates with respect to the second hinge axis A2. The second guide hole 132 is rotatably combined with the other end 120b of the link member 120. The second guide hole 132 is defined through the base member 110 eccentrically from the central axis C1 of the folder to guide the link member 120 so that the other end 120b of the link member 120 can move along a second trace when the folder 20 rotates with respect to the third hinge axis A3. The guide pins 133 are combined with both ends 120a and 120b of the link member 120 to move along the first guide hole 131 and the second guide hole 132.

The first guide hole 131 and the second guide hole 132 have curved shapes and the second guide hole 132 is longer than the first guide hole 131 in order to move the central axis C1 of the folder 20 by an angle, such as 90°.

The first guide hole 131 has ends 150 and the second guide hole 132 has ends 160. The ends 150 and 160 contact both ends 120a and 120b of the link member 120, respectively, to restrict rotation of the link member 120.

The force supply 140 includes a first elastic member 141 and a second elastic member 142, as shown in FIGS. 2 and 7-10. One end 141a of the first elastic member 141 is engaged with a first fixing member 110a included in the base member 110, as shown in FIG. 3, and the other end 141b of the first elastic member 141 is engaged with the end 120a of the link member 120 by a guide pin 133 in order for the first elastic member 141 to move along the first trace during rotation of the link member 120. One end 142a of the second elastic member 142 is engaged with a second fixing member 110b of the base member 110, as shown in FIG. 3, and the other end 142b of the second elastic member 142 is engaged with the other end 120b of the link member 120 by a guide pin 133 in order for the second elastic member 142 to move along the second trace during rotation of the link member 120.

The folder 20 includes a display device 201 and the connection member 30 includes a sub display device 203.

In the hinge device 100, a flexible circuit hole (not shown) is formed to allow a flexible circuit (not shown) electrically connected with the main body housing 10 to penetrate the connection member 30.

The operation of one example of the hinge device 100 according to the present invention will now be described in more detail with reference to FIGS. 2 through 10. The portable terminal includes the main body housing 10, the folder 20, and the connection member 30, as shown in FIG. 2.

The main body housing 10 includes a keypad 101 and a microphone device 102 and the folder 20 includes a display device 201 and a speaker device 202. The connection member 30 connects the folder 20 to the main body housing 10 so the folder 20 can rotate with respect to the first hinge axis A1 towards or away from the main body housing 10.

The hinge device 100 is mounted in the mounting groove 31 formed in the connection member 30, as shown in FIG. 3. The hinge device 100 includes the base member 110, the link member 120, the guide 130, and the force supply 140. The force supply 140 includes the first elastic member 141 and the second elastic member 142.

The first elastic member 141 and the second elastic member 142 are provided in the receiving member 111 of the base member 110.

Ends 141a and 142a of the first elastic member 141 and the second elastic member 142 are engaged with the first fixing member 110a and the second fixing member 110b of the base member 110 and the other ends 141b and 142b of the first elastic member 141 and the second elastic member 142 are engaged with the end 120a and the other end 120b of the link member 120 by the guide pins 133. The guide pins 133 penetrate the first guide hole 131 and the second guide hole 132 of the base member 110.

The base member 110 is engaged with and fixed to the connection member 30 by the at least one engagement fixing unit 112 formed in the base member 110 and the link member 120 is engaged with and fixed to the folder 20 by the at least one engagement fixing unit 121 formed in the link member 120.

As shown in FIGS. 5 through 8, when a user horizontally rotates the folder 20 positioned lengthwise at an angle, the end 120a of the link member 120 moves with respect to the second hinge axis A2 along with the folder 120. The end 120a of the link member 120 moves along the first guide hole 131. A guide pin 133 engaged with the end 120a of the link member 120 is guided along the first guide hole 131.

The end 120a of the link member 120 moves from one end 150 of the first guide hole 131 and contacts the other end 150 of the first guide hole 131, whereby rotation of the link member 120 is restricted.

The first elastic member 141 provides an elastic force to allow the end 120a of the link member 120 to move.

Figure 8:
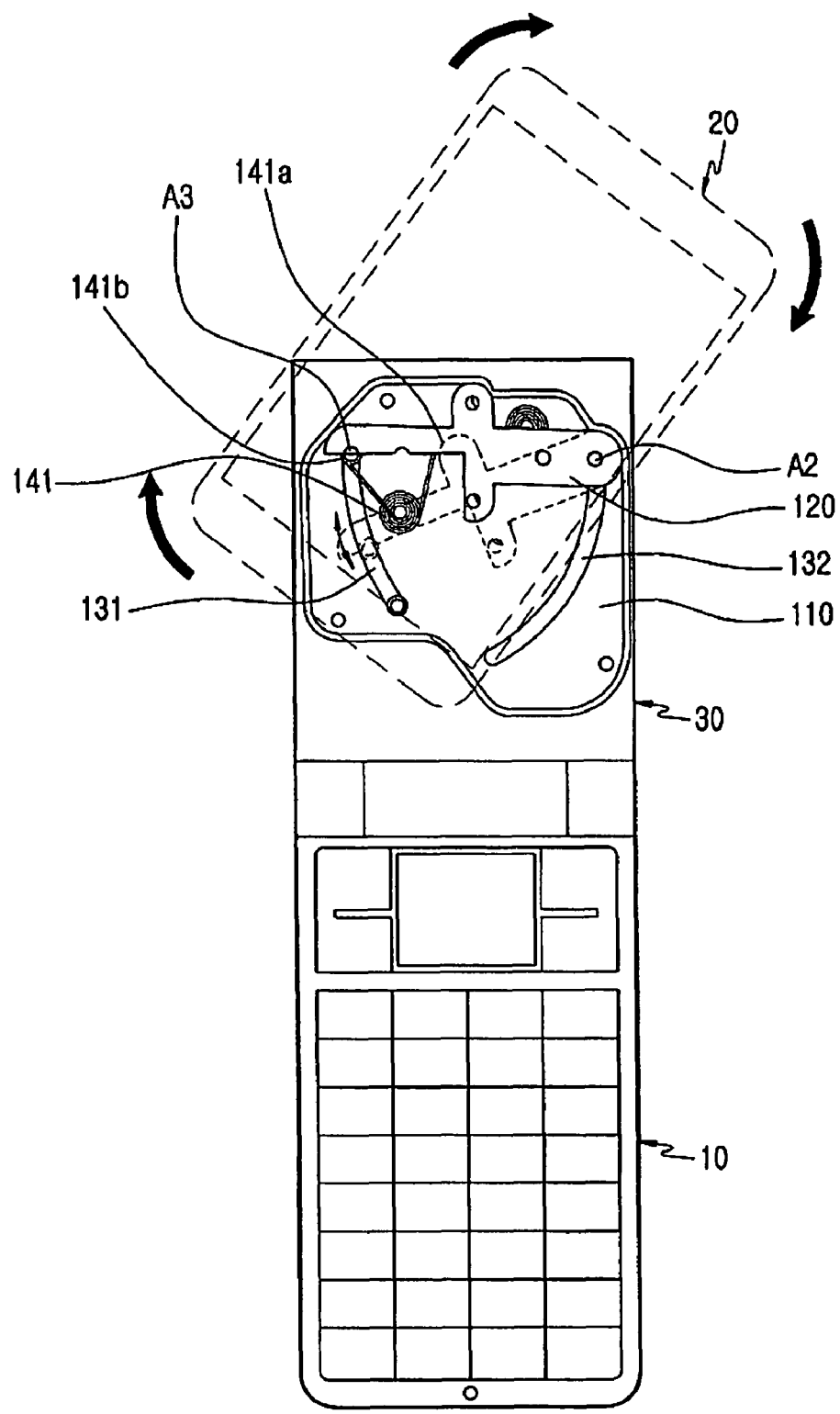
FIG. 8 is a front view showing a process in which a folder rotates in the structure of a hinge device having a plurality of axes for a portable terminal according to the present invention.

As shown in FIG. 8, the central axis C1 provided in the folder 20 moves towards an upper portion of the folder 20.

Figure 9:
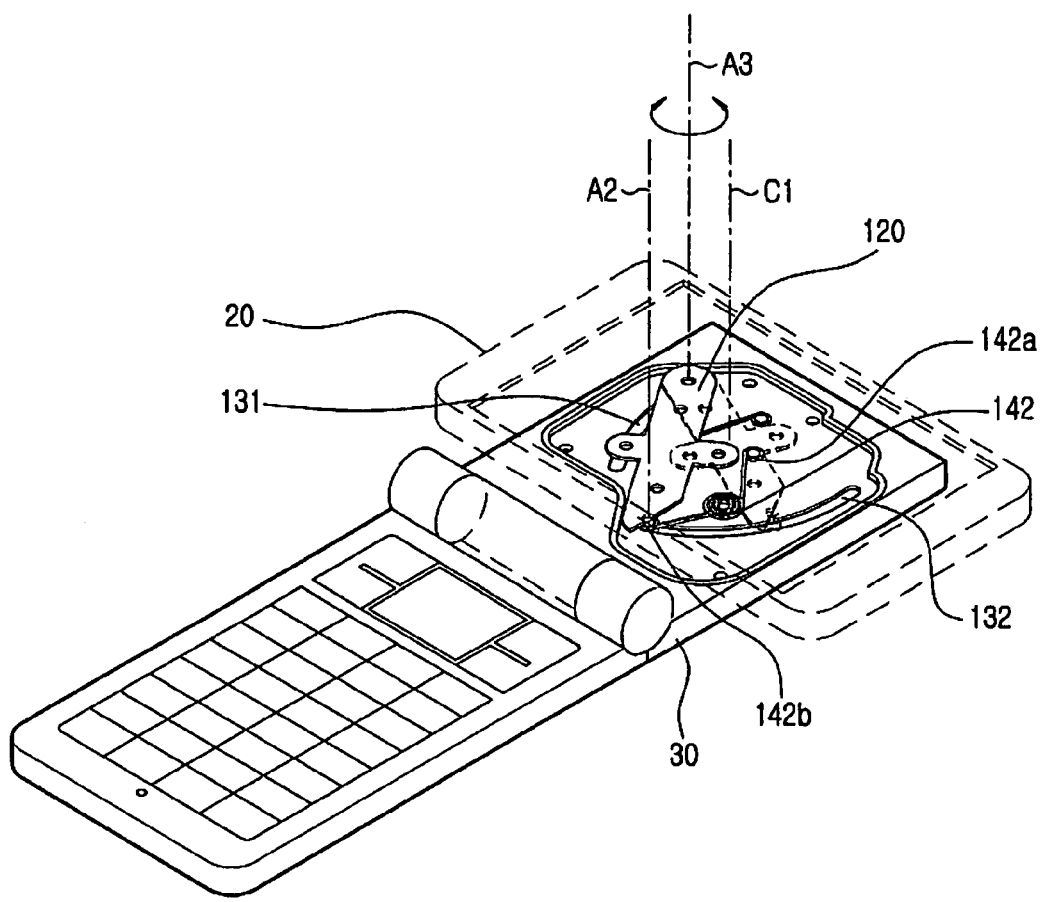
FIG. 9 is a perspective view showing a state in which a folder rotates 90° in the structure of a hinge device having a plurality of axes for a portable terminal according to the present invention.
Figure 10:
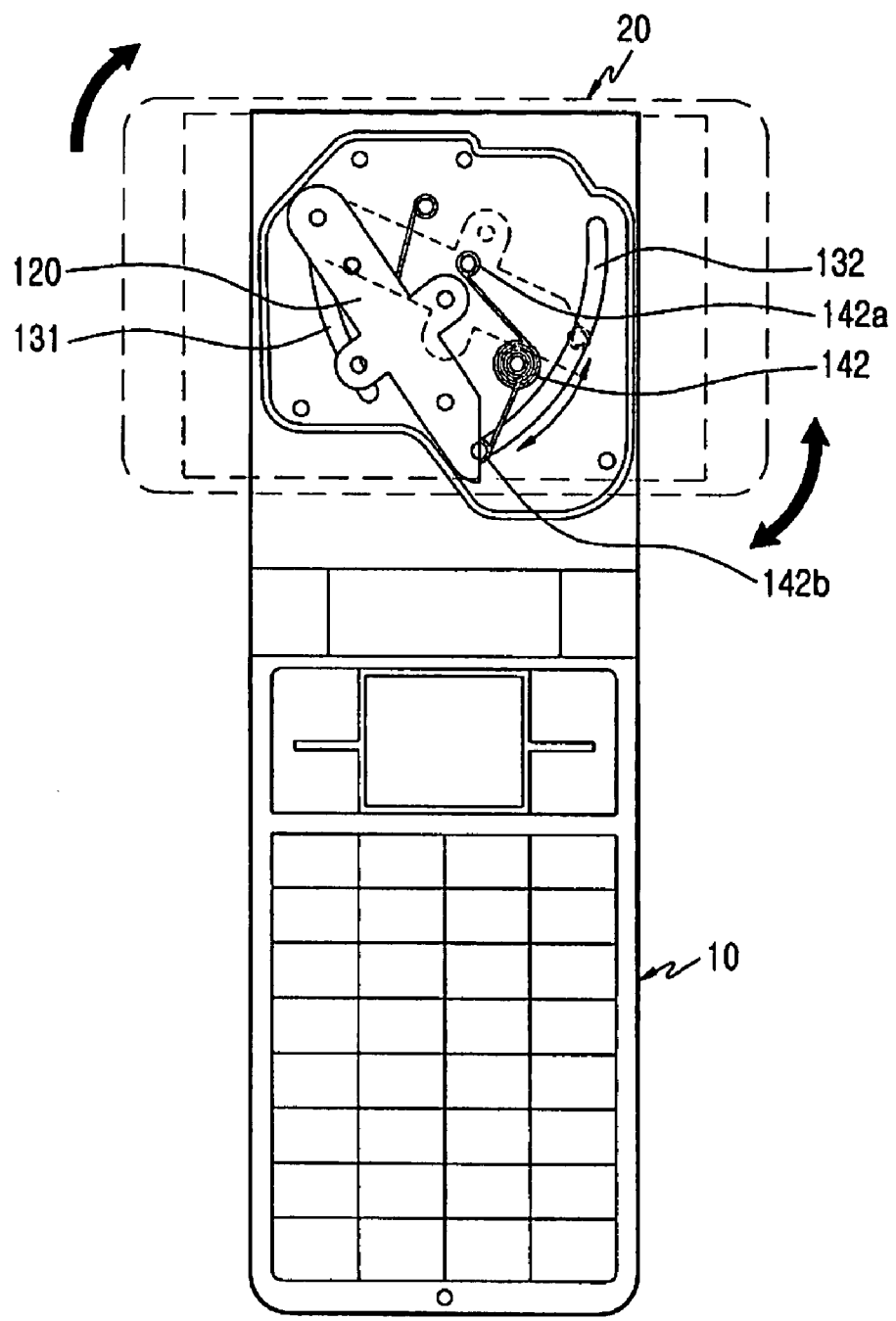
FIG. 10 is a front view showing a state in which a folder rotates 90° in the structure of a hinge device having a plurality of axes for a portable terminal according to the present invention.

As shown in FIGS. 9 and 10, when the folder 20 horizontally rotates an angle, such as 90°, the other end 120b of the link member 120 moves with respect to the third hinge axis A3, along with the folder 20, and moves along the second guide hole 132. A guide pin 133 engaged with the other end 120b of the link member 120 is guided along the second guide hole 132.

The other end 120b of the link member 120 moves from one end 160 of the second guide hole 132 and contacts the other end 160 of the second guide hole 132, whereby rotation of the link member 120 is restricted.

The second elastic member 142 provides an elastic force to allow the other end 120b of the second member 120 to rotate.

As shown in FIG. 10, the central axis C1 provided in the folder 20 moves towards a lower portion of the folder 20 to position the folder 20 closely to the main body housing 10, thereby minimizing an interval between the folder 20 and the main body housing 10.

Furthermore, when the end 120a of the link member 120 moves with respect to the second hinge axis A2, the end 120a may move closely to the other end 150 of the first guide hole 131 without contact and the other end 120b of the link member 120 may move with respect to the third hinge axis A3 to rotate the folder 20 by an angle, such as 90°.

In the hinge device 100, a flexible circuit hole (not shown) is formed to allow a flexible circuit (not shown) electrically connected with the main body housing 10 to penetrate the connection member 30.

Figure 11:
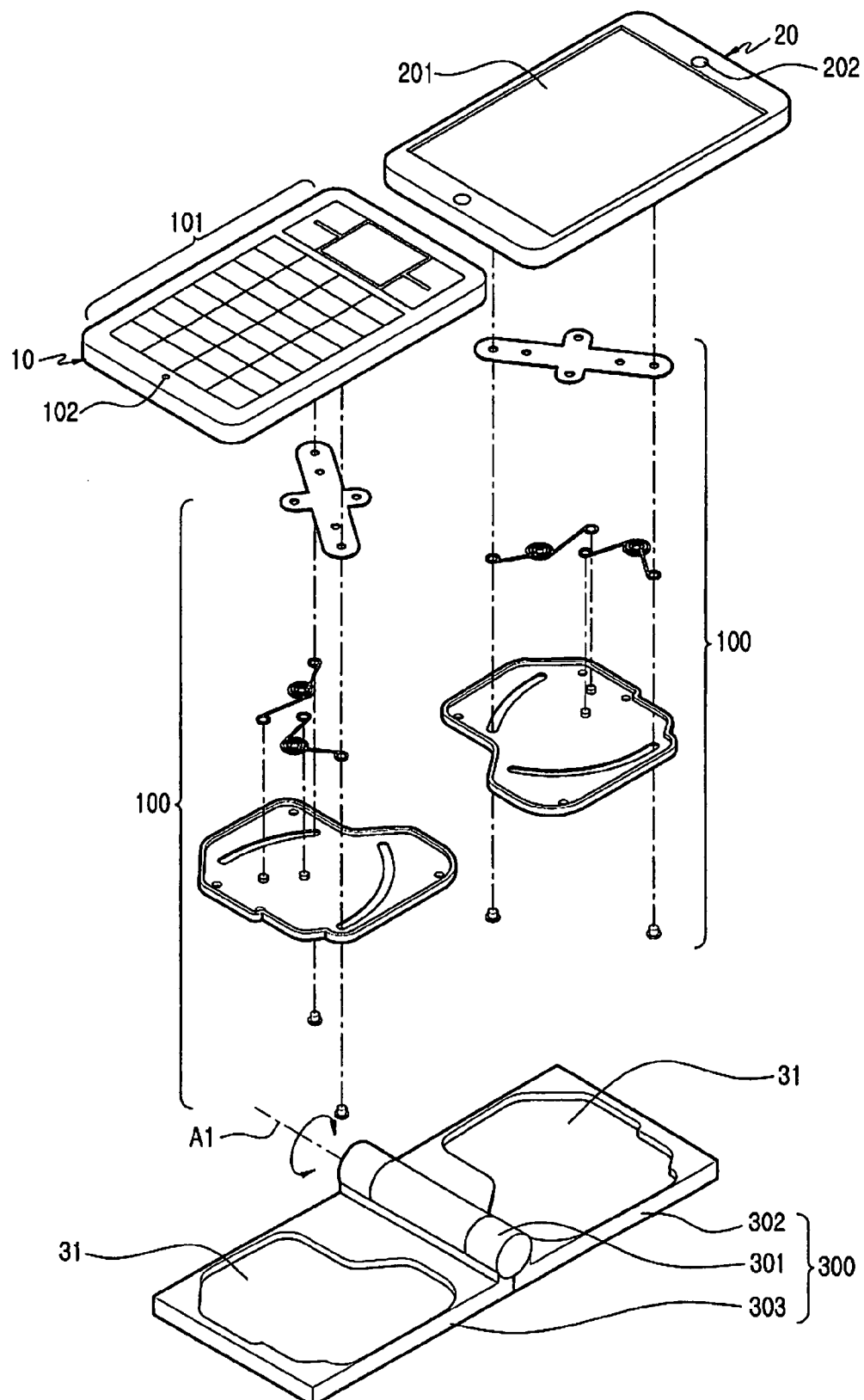
FIG. 11 is an exploded perspective view showing the structure of a dual connection member of a portable terminal according to another embodiment of the present invention.
Figure 12:
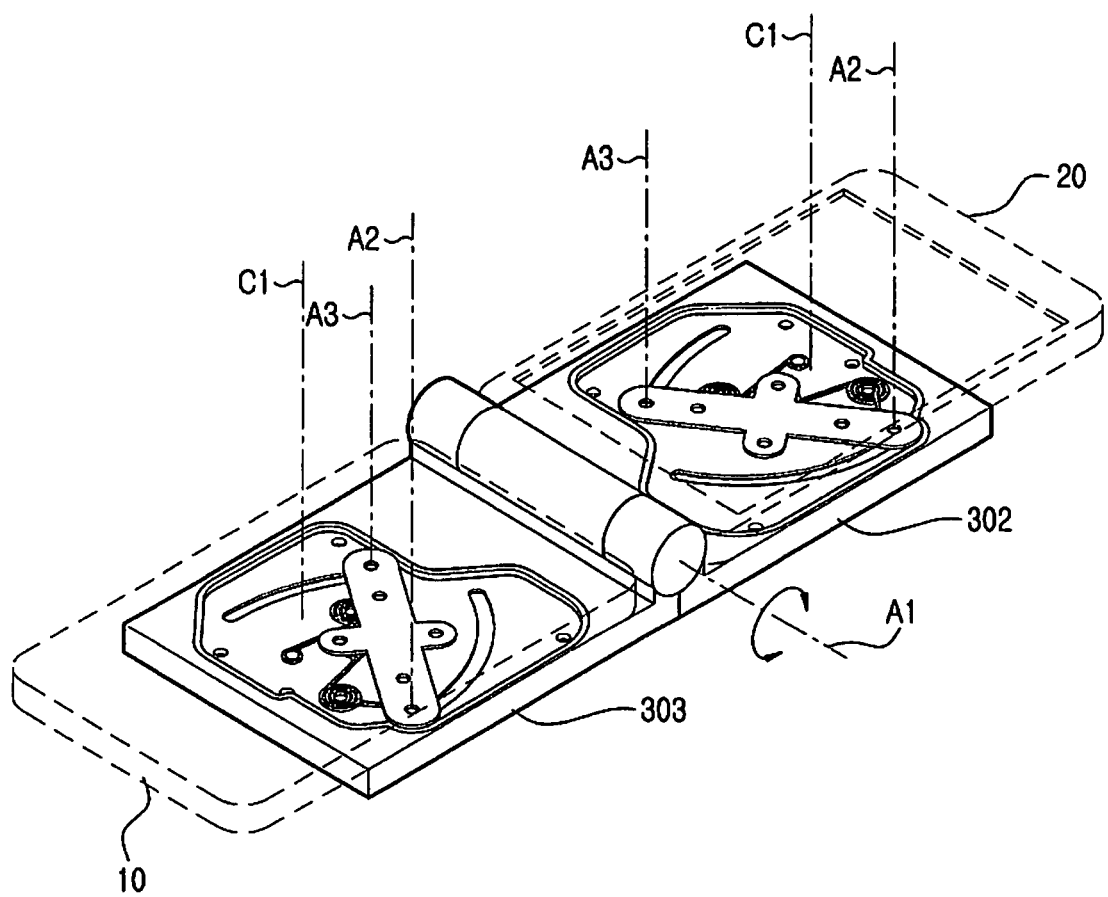
FIG. 12 is a perspective view showing a state in which a dual connection member of a portable terminal according to the present invention is assembled.

An operation of another example of a connection member of a portable terminal according to the present invention will now be described with reference to FIGS. 11 through 14. As shown in FIGS. 11 and 12, a portable terminal including a hinge device 100 includes a main body housing 10, a folder 20, and a connection member 300. The connection member 300 includes a first connection member 301, a second connection member 302, and a third connection member 303.

The second connection member 302 and the third connection member 303 are connected by the first connection member 301 so they can rotate with respect to the first hinge axis A1.

The second connection member 302 and the third connection member 303 each include a hinge device 100, as shown in FIG. 12. The hinge device 100 provides a central axis C1 that extends perpendicularly to the main body housing 10 and provides a second hinge axis A2 and a third hinge axis A3 eccentrically from the central axis C1. The hinge device 100 sequentially rotates the folder 20 and the main body housing 10 eccentrically with respect to the second hinge axis A2 and the third hinge axis A3 and moves the second hinge axis A2 and the third hinge axis A3 along first and second traces, respectively, to move the central axis C1, thereby positioning the folder 20 and the main body housing 10 closely to each other.

Figure 13:
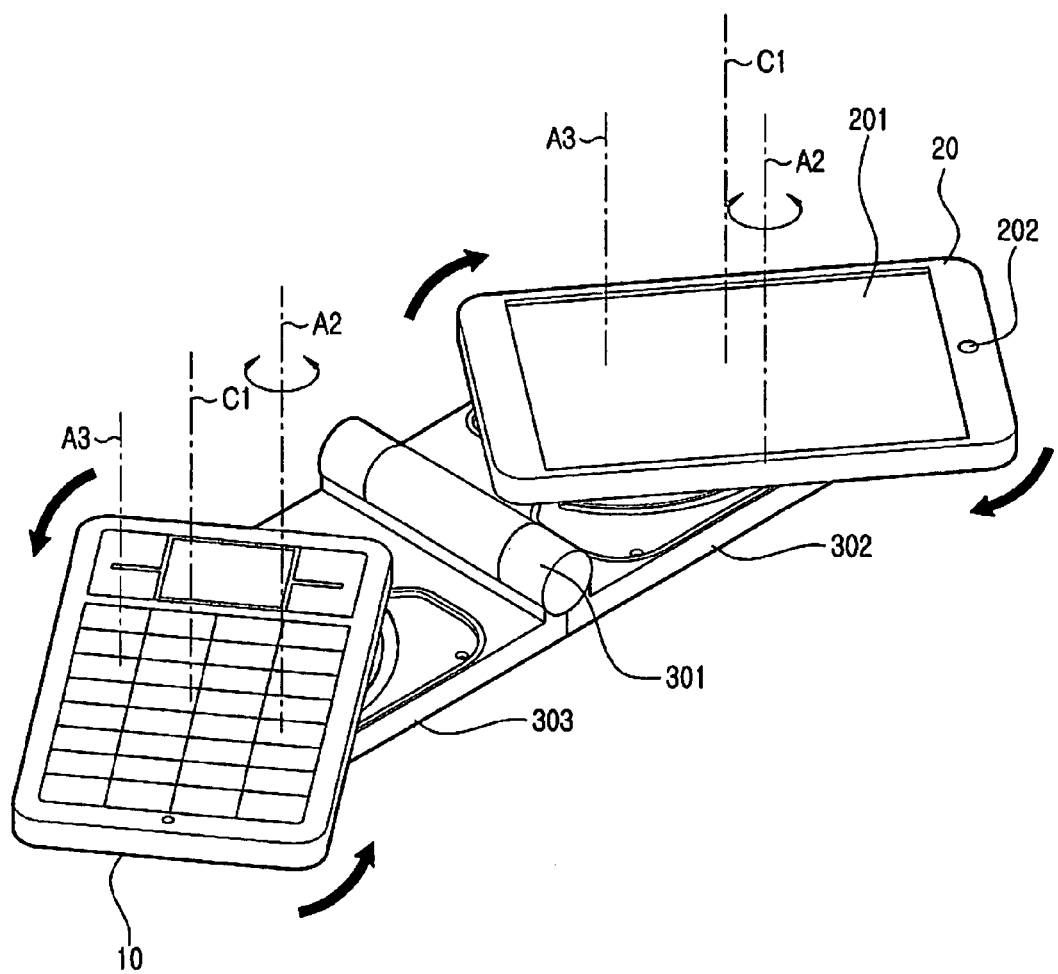
FIG. 13 is a perspective view showing a process in which a main body housing and a folder rotate by a dual connection member according to the present invention.
Figure 14:
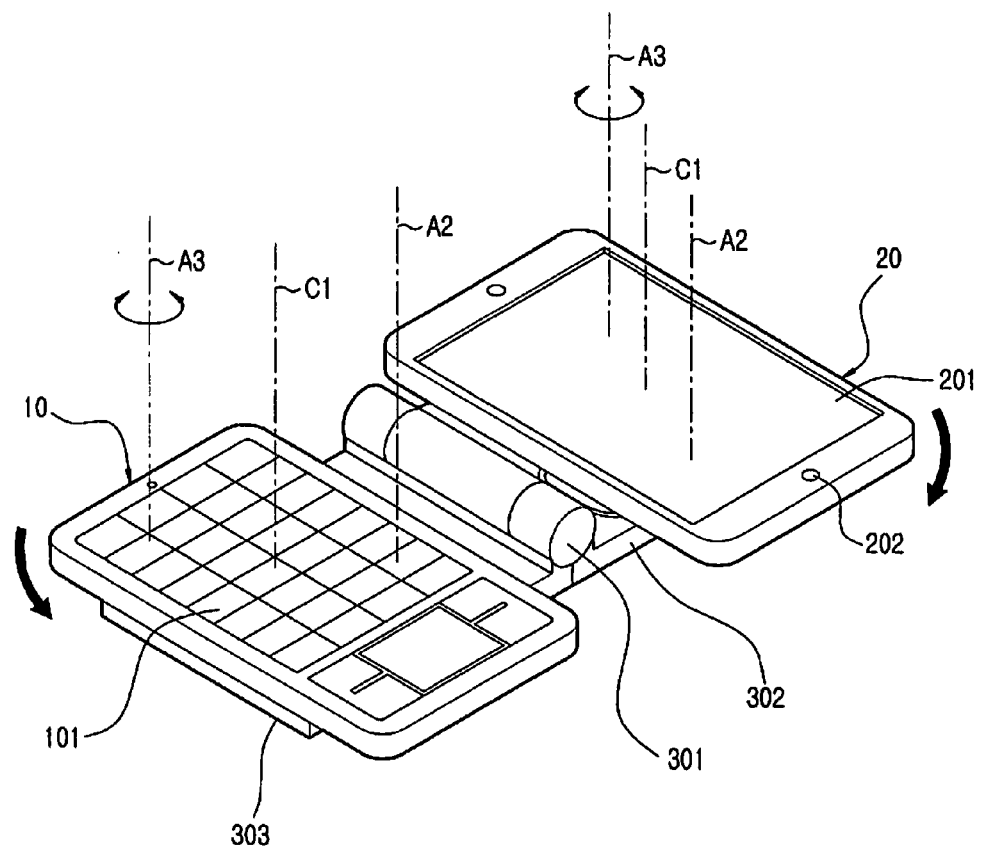
FIG. 14 is a perspective view showing a state in which a main body housing and a folder rotate 90° by a dual connection member according to the present invention.

The second connection member 302 rotates with respect to the second hinge axis A2 during rotation of the folder 20 having a speaker device 202 and a display device 201, and the third hinge axis A3 moves along the first trace, thereby moving the central axis C1 of the folder 20, as shown in FIGS. 13 and 14. The folder 20 then moves with respect to the third hinge axis A3, and the second hinge axis A2 moves along a the second trace, thereby moving the central axis C1 of the folder 20, whereby the folder 20 rotates an angle, such as 90°. The folder 20 is then positioned closely to the main body housing 10.

The third connection member 303 moves with respect to the second hinge axis A2 during rotation of the main body housing 10 including the keypad 101 and the microphone device 102, and the third hinge axis A3 moves along the first trace, thereby moving the central axis C1 of the main body housing 10, as shown in FIGS. 13 and 14. The main body housing 10 moves with respect to the third hinge axis A3, and the second hinge axis A2 moves along the second trace, thereby moving the central axis C1 of the main body housing 10, whereby the main body housing 10 rotates an angle, such as 90°, and the main body housing 10 is positioned closely to the folder 20.

As shown in FIG. 14, the main body housing 10 and the folder 20 are positioned in the shape of an I.

When a user uses the portable terminal in a communication mode, the folder 20 rotates with respect to the first hinge axis A1 in a direction away from the main body housing 10 to position the main body 10 and the folder 20 lengthwise.

When watching television (TV) and moving pictures, the user may need to use the display device 201. the user can then move the folder 20 with respect to the second hinge axis A2 to move the third hinge axis A3 along the first trace. When the folder 20 rotates an angle, such as 90°, the folder 20 moves with respect to the third hinge axis A3, and the second hinge axis A2 moves along the second trace, thereby moving the central axis C1 of the folder 20, whereby the folder 20 positioned lengthwise horizontally rotates.

When using the portable terminal for games or other functions, a user may use the keypad 101 with both hands. Thus, the main body housing 10 including the keypad 101 moves with respect to the second hinge axis A2 to move the third hinge axis A3 along the first trace. When the main body housing 10 rotates an angle, such as 90°, the main body housing 10 moves with respect to the third hinge axis A3, and the second hinge axis A2 moves along the second trace, thereby moving the central axis C1 of the main body housing 10, whereby the main body housing 10 positioned lengthwise horizontally rotates.

As described above, according to the present invention, a central axis of a folder can move with respect to a plurality of hinge axes during rotation of the folder in a folder-type portable terminal, thereby minimizing unnecessary rotation space generated during rotation and thus contributing to miniaturization of the portable terminal. Moreover, a connection member includes a plurality of movable hinge axes for moving a display device and a keypad of the folder-type portable terminal, thereby selectively moving the display device and the keypad according to use of the portable terminal and thus facilitating use of the portable terminal.

While a hinge device having a plurality of movable axes for a portable terminal and a connection member having a plurality of axes according to the present invention have been shown and described with reference to preferred embodiments thereof, it will be understood by those skilled in the art that various changes in form and details may be made therein without departing from the spirit and scope of the invention.

What is claimed is:

1. A hinge apparatus in a device including a main body and an object movable with respect to the main body, the hinge apparatus comprising:
   a hinge that connects the object to the main body and enables eccentric movement of the object with respect to the main body,
   wherein the eccentric movement includes rotating the object with respect to the hinge along first and second movable hinge axes that are parallel to a central axis of the object,
   wherein the central axis of the object moves relative to the hinge during rotation of the object along the first and second movable hinge axes, and wherein the hinge comprises:
   a base member;
   a link member with two ends connected to the object along the first and second movable hinge axes, respectively;
   a guide that connects the link member to the base member so the link member can rotate in the base member, and guides the link member; and
   a force supply included between the base member and the link member to supply force for allowing the link member to rotate.

2. The hinge apparatus according to claim 1, wherein the hinge further comprises a connection member with a mounting groove for mounting the base member.

3. The hinge apparatus according to claim 1, wherein a receiving space for receiving the link member, the guide, and the force supply is formed in the base member and at least one engagement fixing unit engaged with a folder is formed in the receiving space.

4. The hinge apparatus according to claim 1, wherein both ends of the link member are rotatably combined with the guide and at least one engagement fixing unit engaged with and fixed to a folder is further formed in the link member.

5. The hinge apparatus according to claim 1, wherein the guide comprises:
   a first guide hole defined through the base member eccentrically from the central axis, is movably combined with one end of the link member, and allows one end of the link member to move along a first trace during rotation of the object with respect to the first movable hinge axis;
   a second guide hole defined through the base member eccentrically from the central axis, is movably combined with the other end of the link member, and allows the other end of the link member to move along a second trace during rotation of the object with respect to the second movable hinge axis; and
   at least two guide pins that are combined with both ends of the link member and move along the first guide hole and the second guide hole.

6. The hinge apparatus according to claim 5, wherein the first guide hole and the second guide hole have curved shapes and the second guide hole is longer than the first guide hole.

7. The hinge apparatus according to claim 5, wherein a first stopper unit and a second stopper unit are formed in both ends of the first guide hole and the second guide hole to contact both ends of the link member and restrict rotation of the link member.

8. The hinge apparatus according to claim 1, wherein the force supply comprises a first elastic member and a second elastic member,
   wherein one end of the first elastic member is engaged with a first fixing member included in the base member and the other end of the first elastic member is engaged with one end of the link member by a guide pin to move along a first trace during rotation of the link member, and
   one end of the second elastic member is engaged with a second fixing member included in the base member and the other end of the second elastic member is engaged with the other end of the link member by a guide pin to move along a second trace during rotation of the link member.

9. The hinge apparatus according to claim 1, wherein the object is a folder comprising a display device.

10. The hinge apparatus according to claim 1, wherein a flexible circuit hole is defined through the hinge that allows a flexible circuit to penetrate a connection member.

11. The hinge apparatus according to claim 1, in combination with a portable terminal having a main body housing, a folder that rotates with respect to a folder hinge axis in a direction towards or away from the main body housing, and a connection member that provides the folder hinge axis and connects the folder with the main body housing so the folder can rotate with respect to the folder hinge axis.

12. A connection member for a device including a first object and a second object rotatable towards and away from the second object about a folder hinge axis within the connection member, the connection member comprising:
   a first hinge that connects the first object to the connection member enables eccentric movement of the first object with respect to the connection member; and
   a second hinge that the second object to the connection member enabling eccentric movement of the second object with respect to the connection member,
   wherein the eccentric movement of the first object includes rotating the first object with respect to the connection member along first and second movable hinge axes that are parallel to a central axis of the first object,
   wherein the eccentric movement of the second object includes rotating the second object with respect to the connection member along the third and fourth movable hinge axes that are parallel to a central axis of the second object,
   wherein the first plurality of movable axes includes a first movable hinge axis and a second movable hinge axis, and the central axis of the first object moves relative to the connection member during rotation of the first object along the first movable hinge axis and the second movable hinge axis,
   wherein the second plurality of movable axes includes a third movable hinge axis and a fourth movable hinge axis, and the central axis of the second object moves relative to the connection member during rotation of the second object along the third movable hinge axis and the fourth movable hinge axis, and
   wherein the first hinge comprises:
   a base member;
   a link member with two ends connected to the first object along the first and second movable hinge axes, respectively;
   a guide that connects the link member to the base member so the link member can rotate in the base member, and guides the link member; and
   a force supply included between the base member and the link member to supply force for allowing the link member to rotate.

13. The connection member of claim 12, wherein the connection member connects the second object to the first object, and the connection member further comprises:
   a first connection member providing the folder hinge axis and connecting the first object with the second object so the first object can rotate in a direction towards or away from the second object;
   a second connection member providing the first movable hinge axis and the second movable hinge axis, rotating with respect to the first movable hinge axis during rotation of the first object, in which the second movable hinge axis moves along a first trace, thereby moving the first central axis of the first object, and moving the first object with respect to the second movable hinge axis, in which the first movable hinge axis moves along a second trace, thereby moving the central axis of the first object; and
   a third connection member providing the third movable hinge axis and the fourth movable hinge axis, rotating with respect to the third movable hinge axis during rotation of the second object, in which the fourth movable hinge axis moves along a third trace, thereby moving the central axis of the second object, and moving the second object with respect to the fourth movable hinge axis, in which the third movable hinge axis moves along a fourth trace, thereby moving the central axis of the second object.

14. The connection member according to claim 12, wherein one of the first object and the second object is a main body housing of a portable terminal, and the other one of the first object and the second object is a folder of the portable terminal that rotates with respect to the folder hinge axis in a direction towards or away from the main body housing, and
   wherein the main body housing includes a keypad and a microphone device and the folder includes a speaker device and a display device.

15. The connection member of claim 14, wherein the folder rotates with respect to the folder hinge axis in a direction away from the main body housing to position the main body housing and the folder lengthwise in a communication mode,
   wherein the folder rotates with respect to the second hinge axis to move the third hinge axis along a first trace and then rotates an angle with respect to the third hinge axis to move the second hinge axis along a second trace, thereby moving the central axis of the folder and horizontally rotating the folder positioned lengthwise when the display device is used, and
   wherein the main body housing rotates with respect to the second hinge axis to move the third hinge axis along a first trace and then rotates an angle with respect to the third hinge axis to move the second hinge axis along a second trace, thereby horizontally moving the central axis of the main body housing positioned lengthwise when the keypad is used.

16. The connection member according to claim 14, wherein the main body housing and the folder are positioned in a shape of an I when they rotate with respect to the second hinge axis and the third hinge axis.

* * * * *

UNITED STATES PATENT AND TRADEMARK OFFICE
CERTIFICATE OF CORRECTION

PATENT NO.            : 8,250,712 B2                             Page 1 of 1
APPLICATION NO.       : 11/851960
DATED                 : August 28, 2012
INVENTOR(S)           : Jin-Soo Kim et al.

It is certified that error appears in the above-identified patent and that said Letters Patent is hereby corrected as shown below:

On the Title Page

Item [75] Inventors:

Shin-Chul Kamg should be -- Shin-Chul Kang --

Signed and Sealed this
Seventh Day of January, 2014

Margaret A. Focarino
*Commissioner for Patents of the United States Patent and Trademark Office*